(12) United States Patent  (10) Patent No.: US 8,783,929 B2
Habu  (45) Date of Patent: Jul. 22, 2014

(54) LIGHT-TRANSMITTING DECORATIVE GLASS, DECORATIVE GLASS, AND METHOD AND APPARATUS FOR MANUFACTURING DECORATIVE GLASS

(76) Inventor: Kazuto Habu, Hyogo (JP)

( * ) Notice: Subject to any disclaimer, the term of this patent is extended or adjusted under 35 U.S.C. 154(b) by 0 days.

(21) Appl. No.: 13/818,741

(22) PCT Filed: Sep. 8, 2011

(86) PCT No.: PCT/JP2011/005059
§ 371 (c)(1),
(2), (4) Date: Feb. 25, 2013

(87) PCT Pub. No.: WO2012/032784
PCT Pub. Date: Mar. 15, 2012

(65) Prior Publication Data
US 2013/0155718 A1   Jun. 20, 2013

(30) Foreign Application Priority Data
Sep. 8, 2010  (JP) .............................. 2010-006449 U

(51) Int. Cl.
*F21V 7/04* (2006.01)
(52) U.S. Cl.
CPC ....................................... *F21V 7/04* (2013.01)
USPC .......................................... 362/605; 362/600

(58) Field of Classification Search
USPC ........................................................ 362/605
See application file for complete search history.

(56) References Cited

U.S. PATENT DOCUMENTS

| 5,123,722 A | 6/1992 | Meymand |
| 5,297,352 A | 3/1994 | Poll |
| 7,276,181 B2 | 10/2007 | Miwa |
| 7,838,116 B2 | 11/2010 | Vockler et al. |

FOREIGN PATENT DOCUMENTS

| JP | 2004-012946 A | 1/2004 |
| JP | 2004-338344 A | 12/2004 |
| JP | 2009-080982 A | 4/2009 |

*Primary Examiner* — Mary Ellen Bowman
(74) *Attorney, Agent, or Firm* — Ogilvie Law Firm

(57) ABSTRACT

Provided are decorative glass and light-transmitting decorative glass products which are outstandingly decorative by processing a surface of a translucent glass plate, typically used as building materials or for other uses, without impairing the strength of the glass itself. The surface of the translucent glass plate 1, which is 4 to 25 mm in thickness, is impressed to form a plurality of radial cracks 7 each having a diameter of 0.01 to 3.0 mm, so that dots of the cracks 7 form an arbitrary character or pattern to thereby manufacture the decorative glass product. The light-transmitting decorative glass product includes the decorative glass, and a light source which is disposed so as to allow a highly directive irradiating beam to be incident upon any one of the four sides of the translucent glass plate 1 and enter the translucent glass plate.

19 Claims, 7 Drawing Sheets

LIGHT-TRANSMITTING DECORATIVE GLASS, DECORATIVE GLASS, AND METHOD AND APPARATUS FOR MANUFACTURING DECORATIVE GLASS

TECHNICAL FIELD

The present invention relates to an illumination decorative glass and a decorative glass including a glass plate with a microcrack formed on a surface through instantaneous impress thereon using a sharp-pointed working tool, and a method and apparatus for manufacturing such glasses.

BACKGROUND ART

Conventionally, there have widely been used techniques of display on a glass surface. For example, there has been known a technique in which a light emitting device such as a light emitting diode (LED) is disposed in a notched portion provided in an intermediate film that is included in a laminated glass and a conductive film is formed inside the laminated glass as a conductor wire connected to the light emitting device and, with this arrangement, the light emitting device is activated for display (see Patent Document 1, for example). This technique, however, requires a special glass structure because the light emitting device, such as a light emitting diode (LED), is disposed in the notched portion provided in the intermediate film that is included in the laminated glass. This technique suffers from a problem of impaired strength of the glass itself, and further a problem that such a light emitting device cannot be disposed in a single-plate glass.

There has also been known a technique of a functional glass including at least one glass having a conductive film and a light emitting device (see Patent Document 2, for example). In this technique, an installation hole or a thinned portion is provided on a surface of the glass having the conductive film to form an installation portion in which the light emitting device, such as a light emitting diode (LED), is installed. That is, the light emitting device is disposed not in a laminated glass but in a single-plate glass. This technique has the advantage of an increased amount of light when viewed from the surface side of the glass compared to laminated glasses, producing greater color and higher visibility. However, this technique also requires a special glass structure, because the light emitting device is built in the glass itself, suffering from a problem of impaired strength of the glass itself.

Meanwhile, in conventional glass surface processing, polishers and/or chemically corrosive effects have been used to write characters and/or images. Such processing produces solid and liquid waste. A polishing and/or corroding operation of a glass surface consumes much time and labor and also requires high cost and much labor in terms of production, suffering from a problem of difficulty in mass production.
[Patent Document 1] JPA-2003-034560
[Patent Document 2] JPA-2006-323323

OUTLINE OF THE INVENTION

Problems to be Solved by the Invention

Under the above-described circumstances, it is an object of the present invention to provide an illumination highly-decorative glass and a highly-decorative glass formed by processing a surface of a translucent glass plate, generally used for building materials and other applications, without impairing the strength of the glass itself.

It is a further object of the present invention to provide a method and apparatus for manufacturing such an illumination decorative glass and a decorative glass.

Means to Solve the Objects

In order to achieve the above-described objects, the present invention provides an illumination decorative glass including: a decorative glass with at least one radial crack having a predetermined size provided on a surface of a translucent glass plate having a predetermined thickness, the crack serving as a dot that forms an arbitrary character or pattern; and a light source disposed such that a directional radiation beam is made incident into the translucent glass plate through any one of the four side surfaces of the translucent glass plate.

According to the arrangement above, it is possible to provide a highly-decorative glass formed by processing a surface of a translucent glass plate, generally used for building materials and other applications, without impairing the strength of the glass itself.

Providing a radial crack having a predetermined size means producing a microcrack on the surface of the translucent glass plate through instantaneous impress on the surface of the glass plate using a sharp-pointed working tool. Multiple microcracks are provided to serve as dots that form an arbitrary character or pattern.

A directional light source is then disposed on any one of the four side surfaces of the translucent glass plate such that a directional radiation beam is made incident into the translucent glass plate.

Beams from the directional light source transmit through the glass, with the inside of the glass serving as a light guide path, from one side surface to the opposed side surface. In this case, beams reaching glass interfaces undergo total reflection so as not to travel out of the glass because the critical angle between glass and air is about 41 to 43 degrees.

However, producing microcracks on the surface of the glass plate makes beams reaching the crack portion scattered by the cracks travel out of the glass. If multiple cracks serve as dots that form an arbitrary character or pattern, the character or pattern becomes much brighter than the surrounding glass portion. In addition, the cracks are formed only near the surface and cannot impair the strength of the glass itself.

The glass is required to have high transparency to prevent beams from the light source attenuating while transmitting through the glass. The higher transparency the glass has, the brighter the arbitrary character or pattern formed by the crack serving as a dot becomes.

The reason for using a glass plate having a predetermined thickness is that using an excessively thin glass plate would result in impairing the strength of the glass itself as a result of providing a crack, while using an excessively thick glass plate would result in beams from the light source radiating from the side surface reaching interfaces at an incident angle smaller than the critical angle to reduce the brightness of the arbitrary character or pattern formed by the crack serving as a dot.

Providing a radial crack may be construed as trapping air in the clearance gap of the crack. In this case, it may be understood that beams transmitting through the glass plate are scattered by the trapped air and the color of the beams emerges from the arbitrary character or pattern formed by the crack serving as a dot.

The radial crack in the illumination decorative glass according to the present invention may be, specifically, provided through impress on the surface of the translucent glass plate having the predetermined thickness. The radial crack can thus be formed through impress on the surface of the glass plate, that is, a simplified glass surface processing operation is realized.

The radial crack described above is more preferably provided through impress on the surface of the translucent glass plate having the predetermined thickness such that the depth from the surface lies within the range of 0.005 to 0.2 times the thickness. The depth from the surface being less than 0.005 times the thickness would reduce the scattering of beams and therefore the amount of scattered light emerging on the surface of the glass, resulting in a reduction in the visibility and/or clarity of the designed character or pattern. The depth from the surface being more than 0.2 times the thickness would increase the impact strength for the glass plate and be likely to cause cracking in the surface of the glass, resulting in impairing the strength of the glass itself. It is therefore necessary to provide impress such that the depth from the surface lies within the range of 0.005 to 0.2 times the thickness.

Here, it is further preferable to provide impress on the surface of the translucent glass plate such that the depth from the surface lies within the range of 0.005 to 0.02 times the thickness. This can reduce the impact strength for the glass plate and be less likely to cause cracking in the surface of the glass to prevent the strength of the glass itself being impaired.

The radial crack described above preferably has a diameter of 0.01 to 3.0 mm. The crack, which is formed radially on the surface of the glass plate, can have a diameter of 0.01 to 3.0 mm. A diameter of less than 0.01 mm would result in an excessively small light scattering area, resulting, in turn, in a reduction in the visibility and/or clarity of the character or pattern. On the other hand, a diameter of more than 3.0 mm would result in the crack itself being visible, resulting, in turn, in a deterioration in the design.

Here, it is further preferable that the radial crack has a diameter of 0.01 to 1.0 mm. This further improves the design and decoration.

The translucent glass plate preferably used has a thickness of 4 to 25 mm. The glass plate having a small thickness of less than 4 mm would result in impairing the strength of the glass itself as a result of providing a crack, while the glass plate having a great thickness of more than 25 mm would result in that beams from the light source radiated from the side surface may reach interfaces at an incident angle smaller than the critical angle to reduce the brightness of the arbitrary character or pattern formed by the crack serving as a dot.

It is further preferable that the translucent glass plate used has a thickness of 10 to 25 mm. This is because it facilitates radiation of beams from the light source from the side surface.

Here, the directional light source described above may be, specifically, composed of a light emitting diode (LED). This is for the reason that light emitting diodes (LEDs) are expected to be future illumination light sources and also have sufficient directionality. Alternatively, a laser diode (LD) or a laser may be utilized. Beams from an LED or an LD may be guided through an optical fiber to use the tip end of the optical fiber as a light source.

The directional light source described above is, more preferably, composed of a light emitting diode (LED) arranged to emit different colors over time. By emitting different colors over time, improvements can be made in design and decoration.

In addition, a light-blocking frame body is more preferably provided on the side opposed to that on which the light source is disposed among the four side surfaces of the translucent glass plate. The side opposed to that on which the light source is disposed remaining an end surface of the glass would cause beams from the light source to leak therethrough. The more highly directional and brighter the LED is, the higher the amount light leaks. For example, if the light source is disposed on the lower side of the glass, light leaks through the upper side surface of the glass as reflected glare from an object over the glass or the ceiling. To address this, it is preferable to provide a light-blocking frame body on the side opposed to that on which the light source is disposed.

In another aspect, the surface of the translucent glass plate is preferably plated or vapor-deposited with tin or silver. The surface of the translucent glass plate may be plated or vapor-deposited with tin or silver and further finished into a mirror-like surface. The arbitrary character or pattern formed by the crack serving as a dot provided on such a mirror-like surface can be made bright.

Also, any on a one-way mirror, a half mirror, a mirror glass, or a mirror may be bonded to the surface of the translucent glass plate. The one-way mirror, half mirror, mirror glass, or the mirror has a thickness smaller than the depth of the crack serving as a dot so that light scattered in the glass plate can emit through the crack on the surface.

Further, the translucent glass plate may be a color glass. The translucent glass plate may not be transparent but a color glass. This also improves the design and decoration.

Next, a decorative glass according to the present invention will be described.

The decorative glass according to the present invention is characterized by including at least one radial crack having a predetermined size provided on a surface of a translucent glass plate having a predetermined thickness, the crack serving as a dot that forms an arbitrary character or pattern, with the inside of the glass serving as a light guide path.

According to the arrangement above, it is possible to provide a highly-decorative glass formed by processing a surface of a translucent glass plate, generally used for building materials and other applications, without impairing the strength of the glass itself.

Providing a radial crack having a predetermined size means producing a microcrack on the surface of the translucent glass plate through instantaneous impress on the surface of the glass plate using a sharp-pointed working tool. Multiple microcracks are provided to serve as dots that form an arbitrary character or pattern.

Beams from a directional light source, if applied on one side surface of the decorative glass, transmit through the glass from the one side surface to the opposed side surface.

In this case, beams reaching glass interfaces undergo total reflection so as not to travel out of the glass because the critical angle between glass and air is about 41 to 43 degrees.

Producing microcracks on the surface of the glass plate makes beams reaching the crack portion scattered by the cracks travel out of the glass. If multiple cracks serve as dots that form an arbitrary character or pattern, the character or pattern becomes much brighter than the surrounding glass portion.

The reason for using a glass plate having a predetermined thickness is that using an excessively thin glass plate would result in impairing the strength of the glass itself as a result of providing a crack, while using an excessively thick glass plate would result in beams from the light source radiating from the side surface reaching interfaces at an incident angle smaller than the critical angle to reduce the brightness of the arbitrary character or pattern formed by the crack serving as a dot.

Providing a radial crack may be construed as trapping air in the clearance gap of the crack. In this case, it may be understood that beams transmitting through the glass plate are scattered by the trapped air and the color of the beams emerges from the arbitrary character or pattern formed by the crack serving as a dot.

The radial crack in the illumination decorative glass according to the present invention may be, specifically, provided through impress on the surface of the translucent glass plate having the predetermined thickness. The radial crack can thus be formed through impress on the surface of the glass plate, that is, a simplified glass surface processing operation is realized.

The radial crack described above is more preferably provided through impress on the surface of the translucent glass plate having the predetermined thickness such that the depth from the surface lies within the range of 0.005 to 0.2 times the thickness. The depth from the surface being less than 0.005 times the thickness would reduce the scattering of beams and therefore the amount of scattered light emerging on the surface of the glass, resulting in a reduction in the visibility and/or clarity of the designed character or pattern. The depth from the surface being more than 0.2 times the thickness would increase the impact strength for the glass plate and be likely to cause cracking in the surface of the glass, resulting in impairing the strength of the glass itself. It is therefore necessary to provide impress such that the depth from the surface lies within the range of 0.005 to 0.2 times the thickness.

Here, it is further preferable to provide impress on the surface of the translucent glass plate such that the depth from the surface lies within the range of 0.005 to 0.02 times the thickness. This can reduce the impact strength for the glass plate and be less likely to cause cracking in the surface of the glass to prevent the strength of the glass itself being impaired.

The radial crack described above preferably has a diameter of 0.01 to 3.0 mm. The crack, which is formed radially on the surface of the glass plate, can have a diameter of 0.01 to 3.0 mm. A diameter of less than 0.01 mm would result in an excessively small light scattering area, resulting, in turn, in a reduction in the visibility and/or clarity of the character or pattern. On the other hand, a diameter of more than 3.0 mm would result in the crack itself being visible, resulting, in turn, in a deterioration in the design.

Here, it is further preferable that the radial crack has a diameter of 0.01 to 1.0 mm. This further improves the design and decoration.

The translucent glass plate preferably used has a thickness of 4 to 25 mm. The glass plate having a small thickness of less than 4 mm would result in impairing the strength of the glass itself as a result of providing a crack, while the glass plate having a great thickness of more than 25 mm would result in that beams from the light source radiated from the side surface may reach interfaces at an incident angle smaller than the critical angle to reduce the brightness of the arbitrary character or pattern formed by the crack serving as a dot.

It is further preferable that the translucent glass plate used has a thickness of 10 to 25 mm. This is because it facilitates radiation of beams from the light source from the side surface.

In another aspect, the surface of the translucent glass plate is preferably plated or vapor-deposited with tin or silver.

Also, any on a one-way mirror, a half mirror, a mirror glass, or a mirror may be bonded to the surface of the translucent glass plate.

Further, the translucent glass plate may be a color glass.

The respective reasons are the same as with the above-described illumination decorative glass and explanation is omitted.

Next, a decorative glass manufacturing method according to the present invention will be described.

The decorative glass manufacturing method according to the present invention includes the following steps 1) to 3):

1) disposing a translucent glass plate having a thickness of 4 to 25 mm on a working table with a shock-absorbing material placed thereon;
2) providing a radial crack having a predetermined size through instantaneous impress on a surface of the translucent glass plate using a hard and sharp-pointed tool with a strength higher than glass; and
3) repeating the step of providing through impress to provide a plurality of cracks serving as dots that form an arbitrary character or pattern.

The hard and sharp-pointed tool is, for example, an aluminum tool having a conical sharp-angled tip end. The tool may be made of iron or diamond. The material is not limited to metal but may be hard resin as long as it has hardness having a strength higher than glass.

Instantaneous impress on the surface of the glass plate may invoke dropping the tool onto the surface of the glass plate. This may be gravitational free fall or swiftly accelerated dropping. It is however necessary to control the dropping of the tool to form a crack not deeper than a certain depth from the surface. Specifically, a stopper may be provided to control the dropping position.

The shock-absorbing material is preferably a felt sheet, which has the advantage of scratch resistance and adherence.

Next, a decorative glass manufacturing apparatus according to the present invention will be described.

The decorative glass manufacturing apparatus according to the present invention includes the following components a) to c):

a) a flat working table with a shock-absorbing material placed thereon;
b) a hard and sharp-pointed tool with a strength higher than glass; and
c) an arm for holding the tool, the arm arranged to move instantaneously downward to a target mounted on the working table so that the tip end of the tool can impress on a surface of the target.

The hard and sharp-pointed tool with a strength higher than glass is, for example, an aluminum tool having a conical sharp-angled tip end, as is the case above. The tool may be made of iron or diamond. The material is not limited to metal but may be hard resin as long as it has hardness having a strength higher than glass.

The arm for holding the tool is arranged to control the dropping of the tool to form a crack not deeper than a certain depth from the surface of the target mounted on the working table. Instantaneous downward movement may invoke dropping the tool onto the surface of the target mounted on the working table, as is the case above. This may be gravitational free fall or swiftly accelerated dropping.

The shock-absorbing material is preferably a felt sheet, which has the advantage of scratch resistance and adherence.

In the decorative glass manufacturing apparatus according to the present invention, the arm is preferably movable to any position on the plane on the working table.

The X-direction movable head and the Y-direction movable head may be provided so that the arm is movable to any position on the plane on the working table. The arm may be mounted on the movable heads. The movable heads may be driven by a servomotor to move in the X- and Y-directions.

Alternatively, in the decorative glass manufacturing apparatus according to the present invention, the arm is preferably arranged to be capable of applying an adjusted impress force to the surface of the target. The Z-direction movable head may further be provided so as to be capable of applying an adjusted impress force to the surface of the target. The arm may also be mounted on this movable head, and the movable head may be driven by a servomotor to move in the Z-direction at a predetermined speed.

Adjusting the speed of movement in the Z-direction allows an adjusted impress force to be applied through dropping.

Effects of the Invention

The present invention advantageously provides an illumination highly-decorative glass and a highly-decorative glass formed by processing a surface of a translucent glass plate, generally used for building materials and other applications, without impairing the strength of the glass itself.

Further, the present invention has the advantage that the surface of the glass plate can be processed easily. This can reduce the cost of manufacture and contribute to reducing wasteful labor and waste of natural resources used to build plant equipment.

Furthermore, a desired figure or pattern can be formed on the surface of the glass plate only by changing the positions of forming cracks, whereby it is possible to flexibly respond to various orders from users.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Embodiment 1

Figure 1:
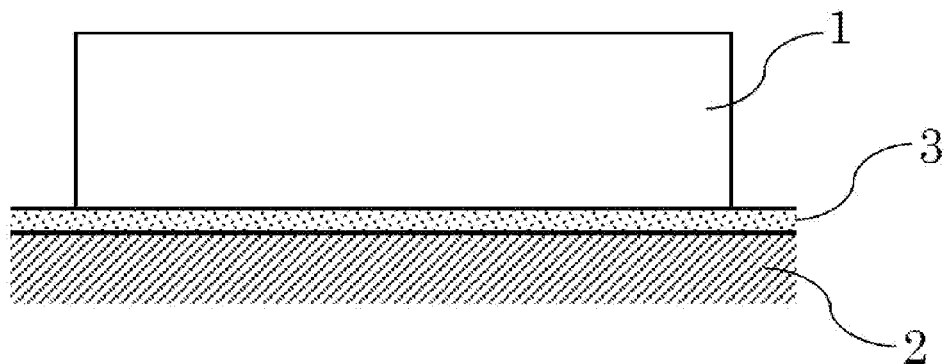
FIG. 1 is a schematic view showing a state where a glass plate is mounted on a working table for production.

FIG. 1 is a schematic view showing a state where a glass plate is mounted on a working table for production. The reference symbol 1 denotes a translucent glass plate, 2 denotes a working table, and 3 denotes a felt sheet. The translucent glass plate 1 has a thickness of 4 to 25 mm, for example, a thickness of 20 mm, and may be available in the market, having as high a transparency as selectable.

The translucent glass plate 1 is placed on the working table 2. The felt sheet 3 is then placed between the working table 2 and the translucent glass plate 1 as a shock-absorbing material for preventing scratching on the surface of the glass and sliding on the surface of the working table.

Figure 2:
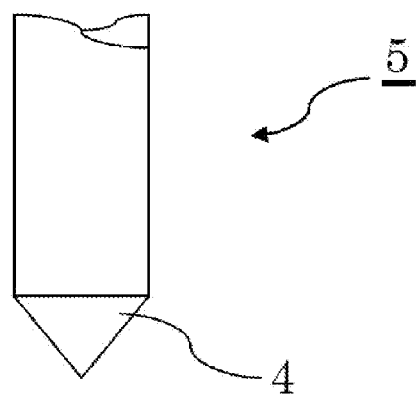
FIG. 2 is a schematic view showing a state immediately before a working tool is applied to the surface of the glass plate.
Figure 2:
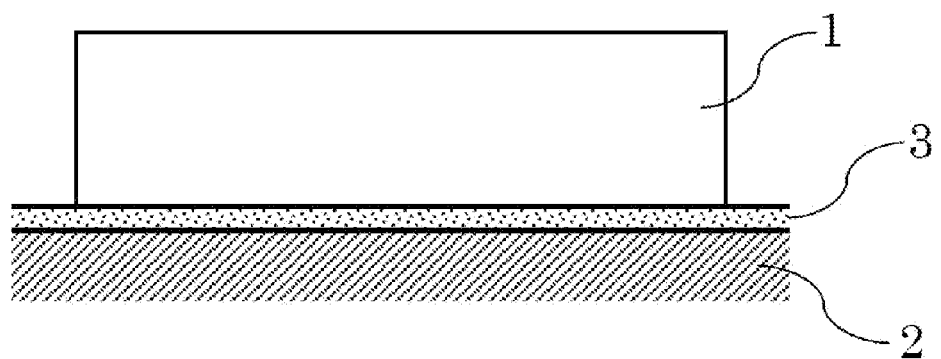

FIG. 2 is a schematic view showing a state immediately before a working tool is applied to the surface of the glass plate. The working tool 5 is made of aluminum and has a conical sharp-pointed tip end 4, and is brought close to the upper surface of the translucent glass plate 1. The working tool 5 is held by an arm (not shown) and the tip end 4 impresses instantaneously on the surface of the glass plate as the arm moves vertically.

Figure 3:
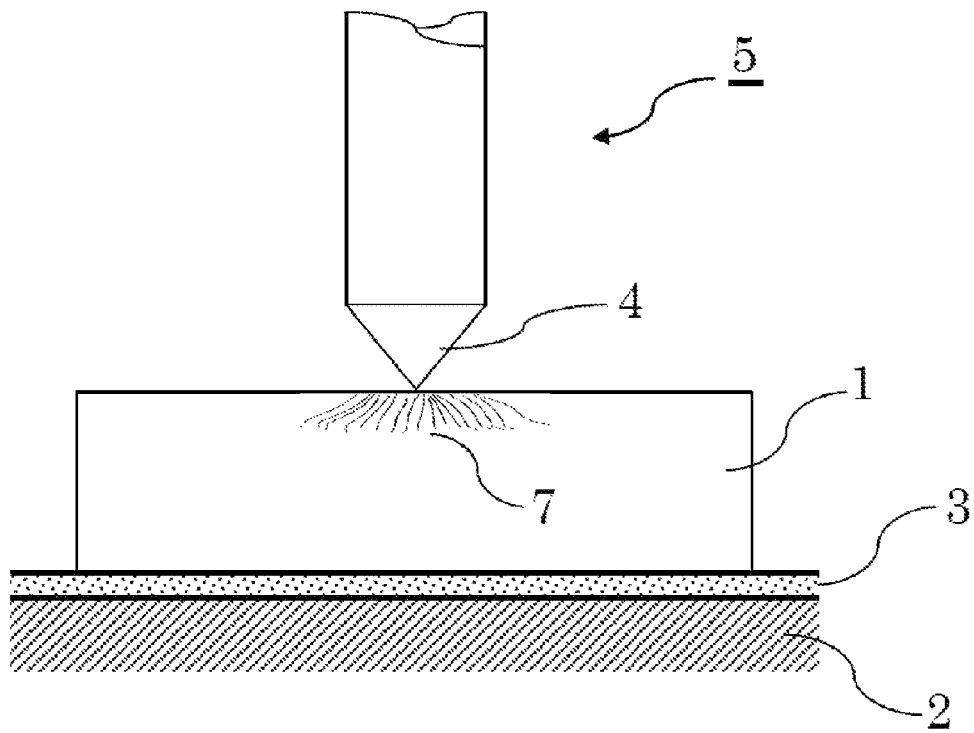
FIG. 3 is a schematic view showing a state after the working tool is applied to the surface of the glass plate and a crack is formed.

FIG. 3 is a schematic view showing a state after the working tool is applied to the surface of the glass plate and a crack is formed. The crack 7 is formed through impress on the translucent glass plate 1 and has a small size and a radial form. The radial crack is provided through impress on the surface of the translucent glass plate such that the depth from the surface lies within the range of 0.005 to 0.2 times the thickness. In this embodiment, the translucent glass plate has a thickness of 20 mm and the depth of the crack is 0.1 times the thickness. The radial crack has a diameter of 1.0 mm.

Figure 4:
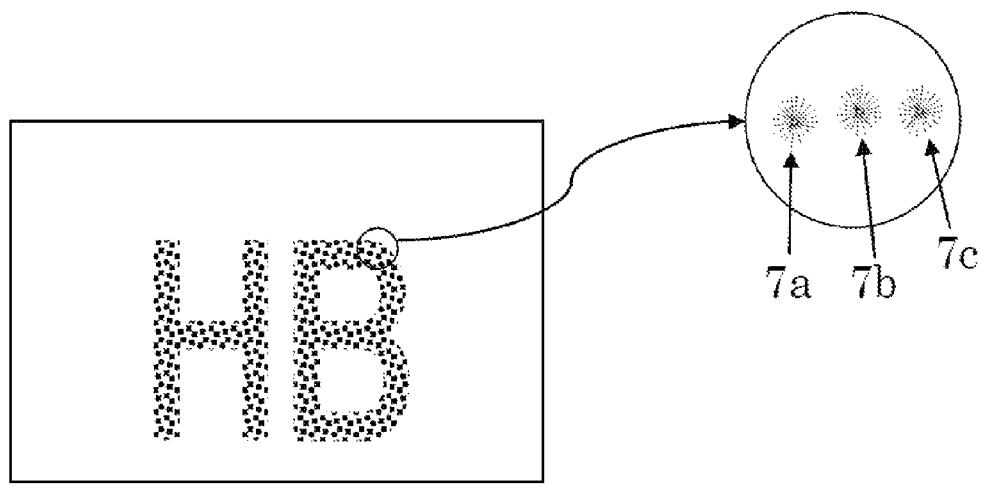
FIG. 4 is an enlarged view of cracks on the surface of the glass plate.

FIG. 4 is an enlarged view of cracks on the surface of the glass plate. Two alphabetical characters ("H" and "B") are formed by cracks serving as dots on the surface of the glass plate. The character "B" is shown in an enlarged (zoomed) manner in the right circle portion. Three cracks (7a, 7b, and 7c) are shown. These cracks have a radial form as shown.

Figure 5:
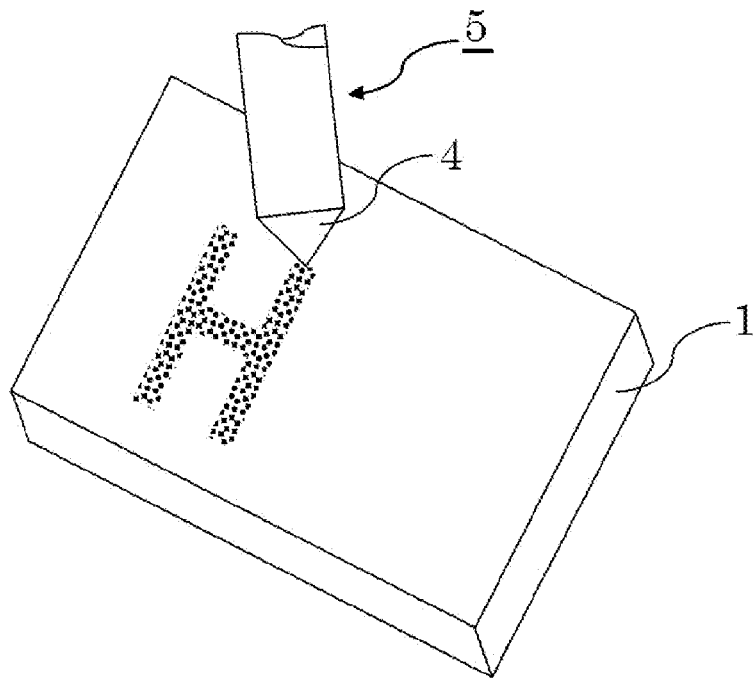
FIG. 5 shows an image diagram of forming a character through sequential impress.

FIG. 5 shows an image diagram of forming a character through sequential impress. The tip end 4 of the working tool 5 moves over the surface of the translucent glass plate to form cracks sequentially.

Figure 6:
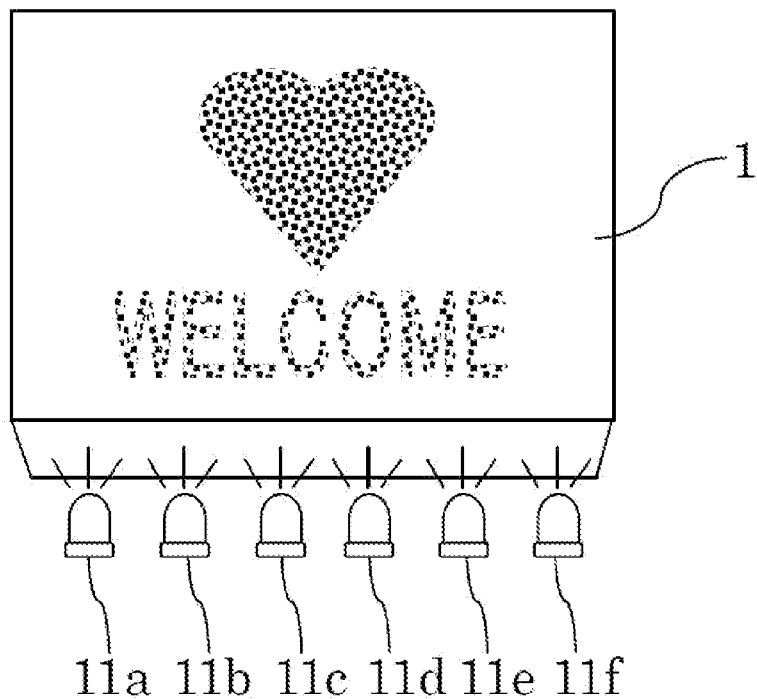
FIG. 6 is an illustrative view showing an arrangement of an illumination decorative glass.

FIG. 6 is an illustrative view showing an arrangement of an illumination decorative glass. The illumination decorative glass includes many radial cracks having a diameter of 0.1 mm provided on a surface of a translucent glass plate 1 having a thickness of 20 mm, the cracks serving as dots that form a character "WELCOME" and a heart-shaped figure. Six LEDs (11a to 11f) are also disposed on the lower side surface of the translucent glass plate 1, so that directional radiation beams from the LEDs are made incident into the translucent glass plate through the lower side surface of the translucent glass plate 1.

Figure 7:
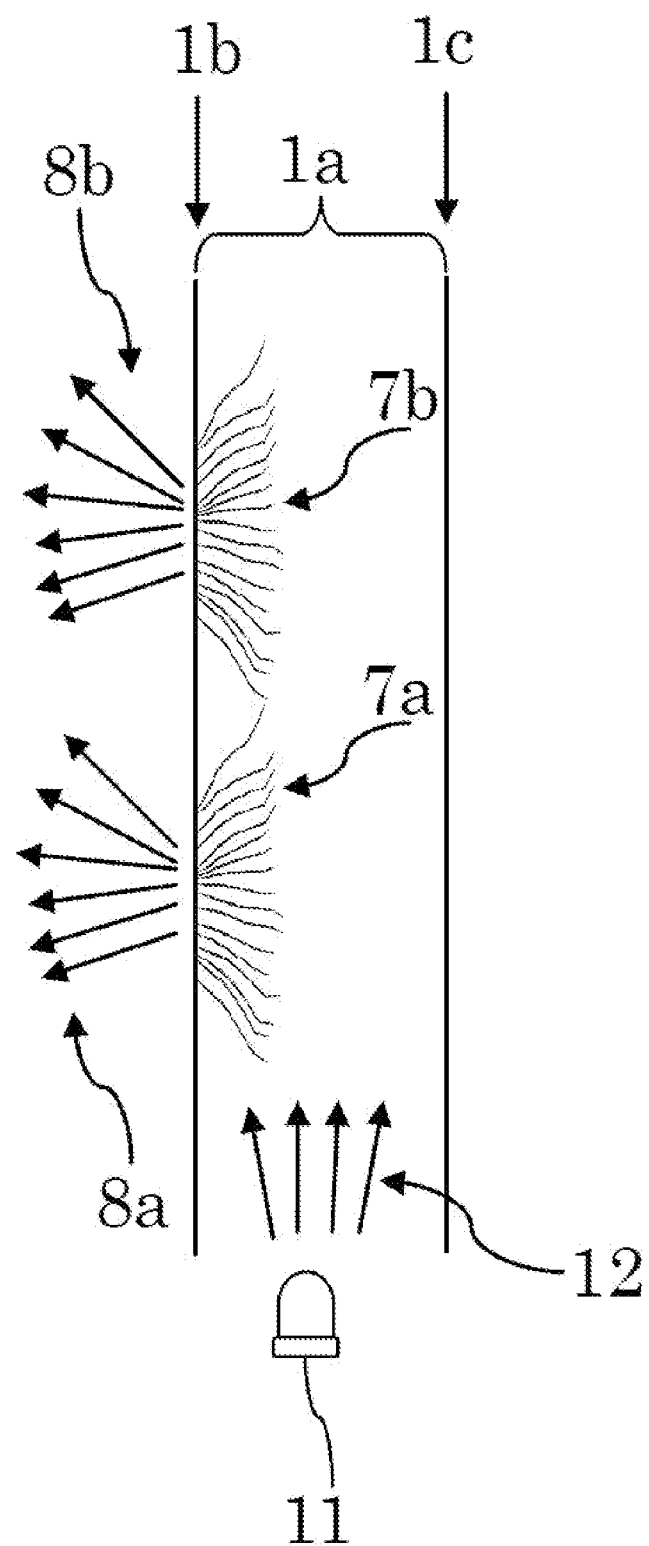
FIG. 7 is illustrative view 1 showing the principles of illumination of the illumination decorative glass.
Figure 8:
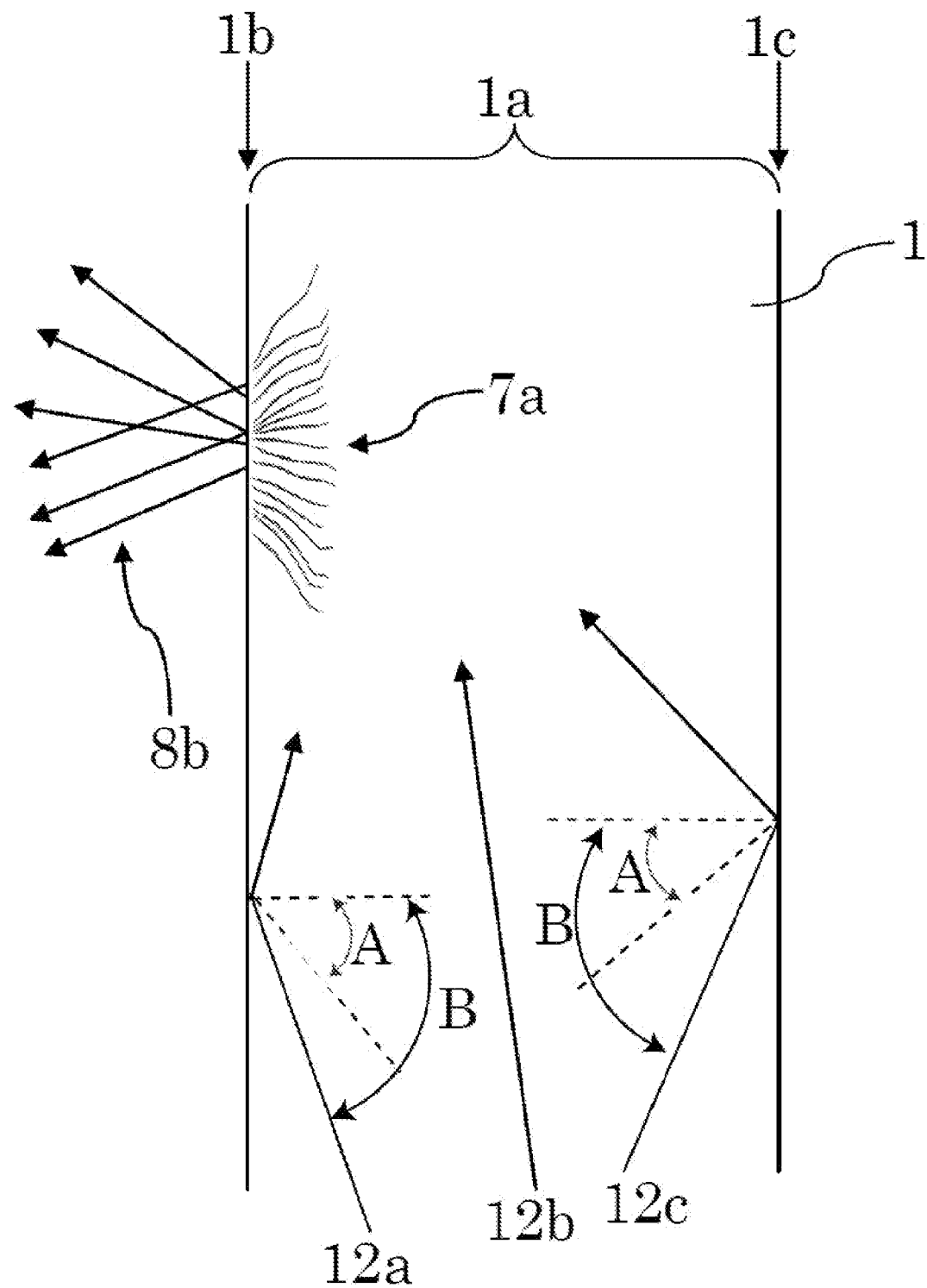
FIG. 8 is illustrative view 2 showing the principles of illumination of the illumination decorative glass.

FIGS. 7 and 8 are illustrative views showing the principles of illumination of the illumination decorative glass. FIGS. 7 and 8 show a side surface of the translucent glass plate.

In FIGS. 7 and 8, the reference symbol 1a denotes the inside of the translucent glass plate, 1b denotes the front surface of the translucent glass plate, and 1c denotes the back surface opposed to the front surface.

As shown in FIG. 7, assuming that two cracks (7a and 7b) are formed in the front surface 1b of the translucent glass plate and highly-directional radiation beams 12 are emitted from an LED 11 on the lower side of the translucent glass plate, the beams travel out of the glass (8a and 8b) through the two cracks (7a and 7b) in the front surface 1b of the translucent glass plate. As a result, the cracks serving as dot portions seem bright when viewed from the front surface side of the translucent glass plate.

The beams travel out not only through the front surface 1b side of the translucent glass plate but also through the back surface 1c side of the translucent glass plate (not shown), though not shown in FIG. 7.

As shown in FIG. 8, among highly-directional radiation beams 12a to 12c emitted from the LED (not shown) and traveling through the inside 1a of the translucent glass plate, the beams 12a and 12b approximating the glass interfaces are reflected at the glass interfaces 1b and 1c. Given that the angle A is the critical angle outgoing from glass to air, the beams 12a and 12b approximating the glass interfaces, the incident angles B of which are both greater than the critical angle, undergo total reflection so as not to travel out of the glass.

Beams traveling through the inside 1a of the translucent glass plate and then the beams traveling through the radial crack 7a are scattered by the crack to travel randomly in all directions, so that the crack serving as a dot portion seems bright when viewed from the front surface side and the back surface side of the translucent glass plate.

Figure 9:
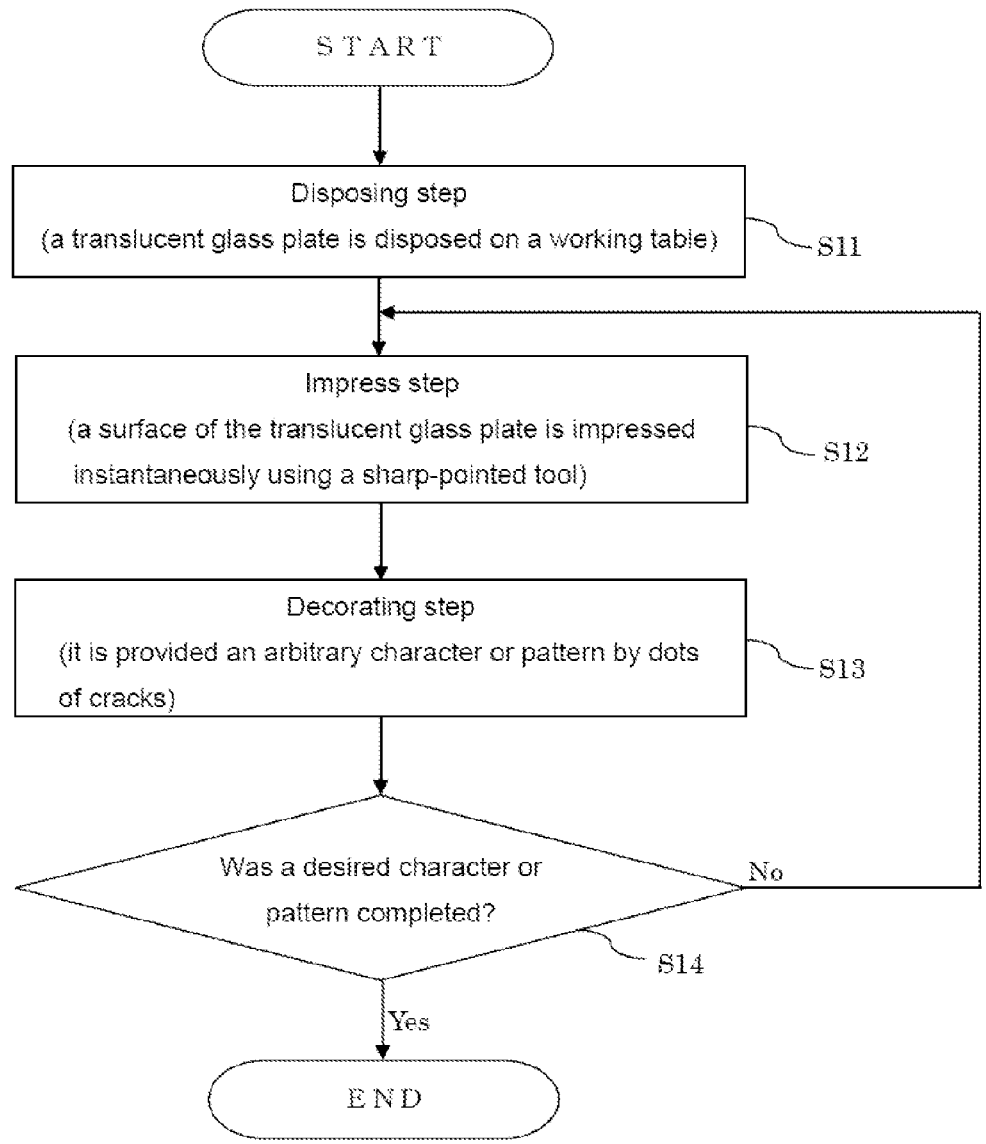
FIG. 9 is a flow chart of a decorative glass manufacturing method.

FIG. 9 is a flow chart of a decorative glass manufacturing method.

The flow of the decorative glass manufacturing method includes a disposing step (step S11), an impress step (step S12), a decorating step (step S13), and a repeating step (step S14).

In the disposing step (step S11), a translucent glass plate having a thickness of 4 to 25 mm is disposed on a working table with a shock-absorbing material placed thereon.

In the impress step (step S12), a radial crack is provided through instantaneous impress on a surface of the translucent glass plate using an aluminum sharp-pointed working tool.

In the decorating step (step S13), the position of impress is shifted to provide cracks serving as dots that form an arbitrary character or pattern.

In the repeating step (step S14), it is determined whether or not a desired character or pattern is completed. If not completed, the position of impress is shifted to perform the impress step (step S12) and the decorating step (step S13) again. These steps are repeated.

Figure 10:
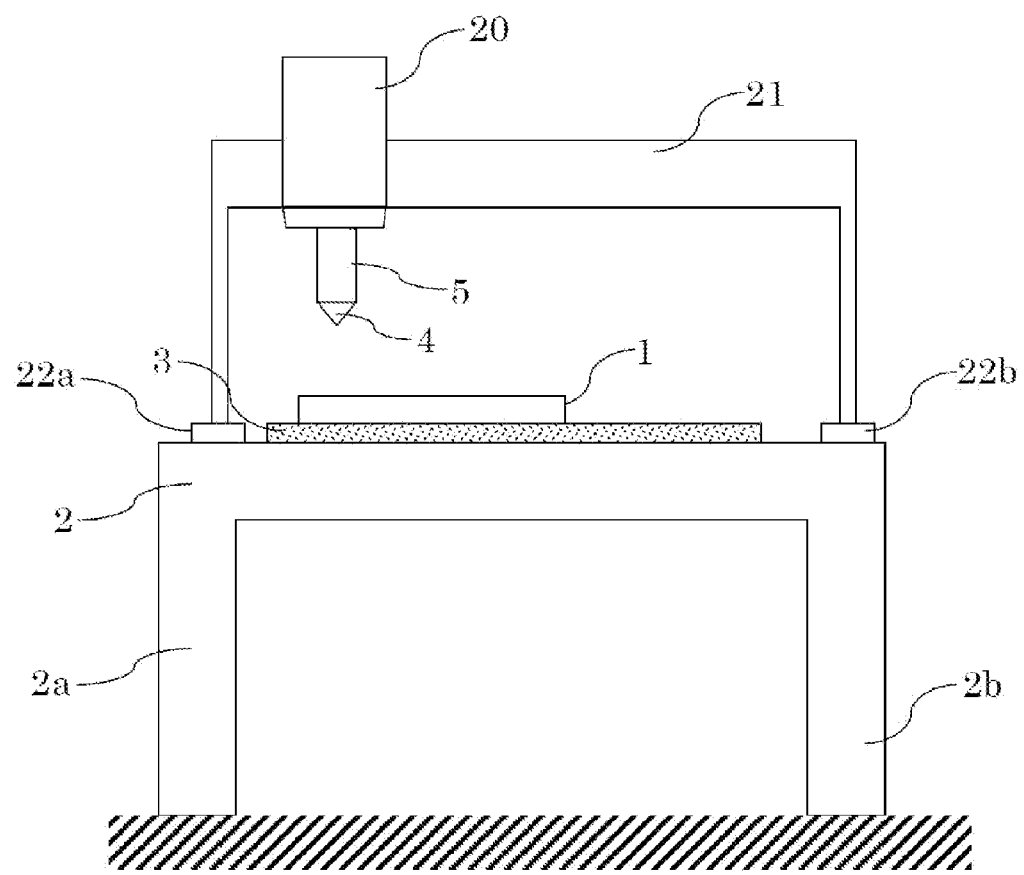
FIG. 10 shows a configuration diagram of a decorative glass manufacturing apparatus.

FIG. 10 shows a configuration diagram of a decorative glass manufacturing apparatus.

The decorative glass manufacturing apparatus includes a flat working table 2 with a felt sheet 3 serving as a shock-absorbing material placed thereon, an aluminum working tool 5 having a sharp tip end 4, and an arm 20 holding the working tool 5. The arm 20 is arranged to move instantaneously downward to a translucent glass plate 1 mounted on the working table 2 so that the sharp tip end 4 of the working tool 5 impresses on a surface of the translucent glass plate 1.

Moreover, the arm 20 is mounted on the X-direction and Y-direction movable drive head 21. The drive head is arranged to be driven by a servomotor (not shown) to move along slide rails (22a and 22b) on the working table.

The arm 20 is also mounted on the Z-direction movable drive head (not shown) so as to apply an adjusted impress force to the surface of the translucent glass plate 1. The drive head is arranged to be driven by a servomotor to move in the Z-direction at a predetermined speed so that the tip end 4 of the working tool 5 can be dropped. Adjusting the speed of movement in the Z-direction allows an adjusted impress force to be applied through dropping.

INDUSTRIAL APPLICABILITY

The illumination decorative glass and the decorative glass according to the present invention are useful for ornaments, stationary articles, clock faces, signboards, display apparatuses, and lighting equipment.

DESCRIPTION OF SYMBOLS 1 translucent glass plate
2 working table
3 felt sheet
4 tip end
5 working tool
7, 7a, 7b crack
8a, 8b light scattered
11, 11a-11f light emitting diode (LED)
12, 12a-12c output light
20 arm

What is claimed is:

1. An illumination decorative glass comprising:
   a translucent glass plate having a front surface, a back surface, and at least one side surface, the front surface having a plurality of dots that form a character or pattern, at least one of the plurality of dots including a radial crack in the translucent glass plate; and
   a light source disposed such that a directional radiation beam from the light source is made incident into the translucent glass plate through at least one side surface of the translucent glass plate.

2. The illumination decorative glass according to claim 1, wherein the radial crack has a diameter of 0.01 to 3.0 mm.

3. The illumination decorative glass according to claim 1, wherein the translucent glass plate has a thickness in the range from 4 to 25 mm.

4. The illumination decorative glass according to claim 1, wherein the light source comprises a light emitting diode (LED).

5. The illumination decorative glass according to claim 4, wherein a light-blocking frame body is provided on a side opposed to the light source.

6. The illumination decorative glass according to claim 1, wherein the light source comprises a light emitting diode (LED) arranged to emit different colors over time.

7. The illumination decorative glass according to claim 1, wherein at least one surface of the translucent glass plate is plated or vapor-deposited with tin or silver.

8. The illumination decorative glass according to claim 1, wherein a one-way mirror, a half mirror, a mirror glass, or a mirror is bonded to at least one surface of the translucent glass plate.

9. A decorative glass comprising a translucent glass plate having a thickness and a surface, the surface having at least one radial crack, the radial crack serving as a dot in a plurality of dots that form a character or pattern.

10. The decorative glass according to claim 9, wherein the radial crack has a diameter of 0.01 to 3.0 mm.

11. The decorative glass according to claim 9, wherein the translucent glass plate has a thickness in the range from 4 to 25 mm.

12. The decorative glass according to claim 9, wherein at least one surface of the translucent glass plate is plated or vapor-deposited with tin or silver.

13. The decorative glass according to claim 9, wherein a one-way mirror, a half mirror, a mirror glass, or a mirror is bonded to at least one surface of the translucent glass plate.

14. A decorative glass manufacturing method comprising the steps of:
   disposing a translucent glass plate having a thickness of 4 to 25 mm on a working table with a shock-absorbing material placed thereon;
   providing a radial crack in the translucent glass plate by impressing a point of a hard and sharp-pointed tool on a surface of the translucent glass plate, the tool point having a strength higher than glass; and
   repeating the providing step by impressing the tool point at a plurality of locations on the surface of the translucent glass plate to provide a plurality of cracks serving as dots that form a character or pattern.

15. The decorative glass manufacturing method according to claim 14, wherein the providing step provides on the surface of the translucent glass plate a radial crack having a greatest depth from the surface, and the greatest depth of the radial crack from the surface lies within the range of 0.005 to 0.2 times the thickness of the translucent glass plate.

16. The decorative glass manufacturing method according to claim 14, wherein the radial crack has a diameter of 0.01 to 3.0 mm.

17. A manufacturing apparatus for manufacturing decorative glass, the apparatus comprising:
- a flat working table with a shock-absorbing material placed thereon;
- a hard and sharp-pointed tool with a strength higher than glass, the tool having a tip end which has a point; and
- an arm holding the tool, the arm arranged to move the tip end instantaneously downward to a target mounted on the working table so that the tip end of the tool can impress a radial crack on a surface of the target.

18. The decorative glass manufacturing apparatus according to claim 17, wherein the shock-absorbing material comprises a felt sheet.

19. The decorative glass manufacturing apparatus according to claim 17, wherein the arm is movable to another position on the working table.

* * * * *